March 19, 1974   C. VITALE   3,798,343
PROCESS FOR PREPARING FROZEN ROLLED LASAGNA
Filed Oct. 27, 1971
Fig. 1
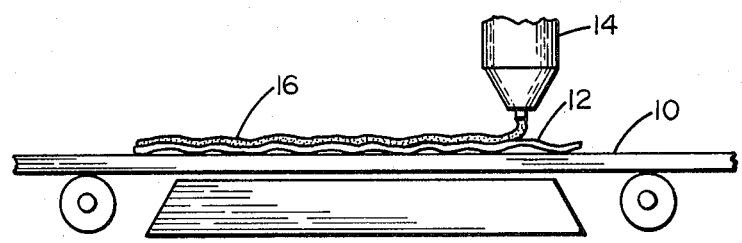
Fig. 2
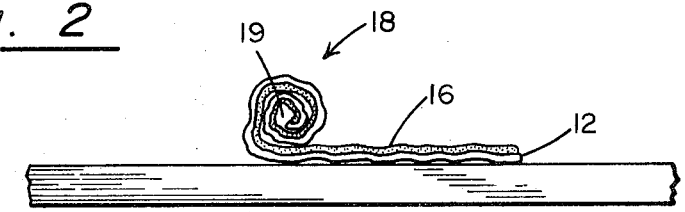
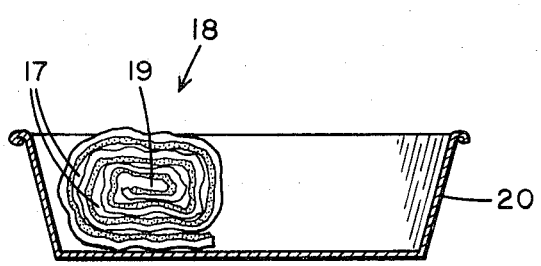
Fig. 3
INVENTOR.
CONSTANCE VITALE
BY Stryker & Jacobson
ATTORNEYS United States Patent Office 3,798,343
Patented Mar. 19, 1974

3,798,343
PROCESS FOR PREPARING FROZEN
ROLLED LASAGNA
Constance Vitale, St. Paul, Minn., assignor to Vitale's
Italian Foods, Inc., St. Paul, Minn.
Filed Oct. 27, 1971, Ser. No. 192,887
Int. Cl. A23b 1/00
U.S. Cl. 426—502                                    4 Claims

ABSTRACT OF THE DISCLOSURE

Precooked, frozen lasagna is prepared by coating a noodle with a meat composition, rolling the noodle into a spiral roll with the meat surface facing inward, and freezing the rolled noodle.

BACKGROUND OF THE INVENTION

The traditional method of preparing lasagna involves filling a pan with alternate layers of noodles, meat and cheese, and then baking this composition and cutting it into portions. This process is very difficult to adapt to commercial production, especially for the frozen food market. On a typical assembly line, the product must circle several times so as to pass the ingredient dispensing apparatus a number of times. In the alternative, a very long assembly line is needed with an expensive duplication of equipment. Since the finished product is a combination of melted cheese, meat and soft noodles, it is extremely difficult to cut portions of a consistent size and weight. The meat and cheese tend to separate from the noodles and stick to the cutting utensils so that consistent portions are virtually impossible to produce. If these portions are then transferred into a tray or sealed plastic pouch for freezing, they become even more disheveled and finally, upon additional handling, reach the consumer in a completely disorganized state which is not attractive. Since the appearance of the product is quite important to the marketing aspects, this is highly undesirable. If the prior art lasagna is sold by the trayful, that is, not cut into portions, then the individual portions cannot be separated as they are frozen solidly together. The consumer is therefore forced to heat the whole tray.

Another disadvantage found in the prior art method of preparation is that the combination of noodles, meat and cheese in a layered configuration forms a relatively dense and solid mixture which is difficult to freeze quickly. The outer portions freeze first and it is difficult to determine when the inner portions are completely frozen so that long freezing periods are necessitated to insure success. It would, therefore, be very desirable to find a way in which to freeze lasagna more quickly so as to better retain the flavor, increase the production rate and lower refrigeration costs.

Yet another disadvantage is encountered when the prior art type of lasagna is defrosted and reheated. With the lasagna completely filling a pan, there is a tendency for the material around the edges to be burned before the center portion is properly heated. If the lasagna is kept kept away from the edges of the pan it tends to melt and flow spreading out a thin mixture over the bottom of the pan which burns.

The process of the present invention avoids all of the above difficulties with a novel method of preparation of frozen lasagna.

SUMMARY OF THE INVENTION

Briefly, the present process leaves the traditional method of alternate layers of meat, cheese, and noodles and instead, employs a process wherein the cheese and meat are applied to one face of a single noodle which is then rolled in a spiral and frozen. The spiral tends to hold its shape better and produce a product with a more pleasing appearance. The assembly line is short and no equipment needs to be duplicated. Individual portions result which can be separated from other protions for reheating. Furthermore, the rolling process leaves several holes through the roll, both in the center and out toward the edges which allow circulating cold air to enter so that the whole entire product can be frozen much more quickly, thus lowering costs and increasing the production rate. The faster freezing also protects the flavor of the product. Since the spiral roll does hold its shape, it may be placed in a pan at a distance spaced from the walls of the pan so that there is no tendency of the edge portions to burn. The meat and cheese contents are contained within the spiral and therefore, do not melt and flow as in the prior art. Furthermore, by using the same size noodles in each case, it is possible to produce more accurate portions having identical size and weight which is advantageous for commercial production and easier to handle. It may therefore be seen that it is an object of my invention to provide a process for preparing frozen lasagna which produces a product with better appearance, better flavor, greater uniformity and which is easier to prepare and less expensive. Further objects and advantages will become apparent from the following description and drawings.

BRIEF DESCRIPTION OF THE DRAWINGS

FIG. 1 and FIG. 2 show schematically two of the steps in the preparation of the frozen lasagna according to the process of the present invention.

FIG. 3 shows the configuration of the resultant rolled lasagna which permits it to avod burning, hold its shape better, and freeze and heat faster.

DESCRIPTION OF THE PREFERRED EMBODIMENT

In FIG. 1, a meat composition 16 is being applied to a lasagna noodle 12 by a suitable dispensing mechanism 14. Dispensing mechanisms are well known to those skilled in the art and therefore are not described herein. One advantage of the present invention is that automatic equipment may be readily utilized in the preparation of lasagna which has not heretofore been practical. Thus, in FIG. 1, lasagna noodle 12 is shown as being carried by a conveyer belt mechanism 10 which is shown only schematically. The noodle 12 may be automatically coated with cheese followed by a meat composition and, if desired, a suitable sauce. In the alternative, the meat, sauce and cheese may be combined into a single mixture which is applied to one face of the noodle. The particular recipe or combination of ingredients used is discretionary and not essential to the present invention.

The next step involved in the instant new process is shown in FIG. 2 wherein the composition coated noodle is rolled into a spiral roll 18 with the meat and cheese composition facing inward. Since the layer of composition is trapped inside the spiral roll, there is little or no tendency for it to separate from the noodle and the portion of lasagna holds its shape very well. The rolling process inherently creates a small hole 19 in the center which admits cold air during the subsequent freezing step so as to insure that the lasagna is quickly frozen both from the inside and from the outside so that the flavor is better retained. Additionally, since the freezing step is quicker, refrigeration costs are lowered. The production rate is also accordingly accelerated since the freezing time is reduced.

One way contemplated for packaging the product of the present invention is to place it into a tray 20 such as shown in FIG. 3. The tray serves as a container for freezing, marketing and reheating the product. Since the roll of lasagna is necessarily somewhat soft due to the materials involved in the preparation of this product, it tends to flatten slightly as shown in FIG. 3. The roll already has an air space 19 in the center and several other air spaces open to the interior along the length of the spiral due to the uneven nature of the layered noodle and meat composition. The size of these holes is further increased during the flattening process which tends to open up additional spaces 17 such as shown in FIG. 3 which even further enhance the quick freezing process.

Since the spiral roll holds its shape well, it may be positioned in pan 20 as shown in FIG. 3 at a fixed distance from the side walls so that upon reheating, there is no tendency for the outer portions of the roll to burn. As with the freezing process, the holes 17 and 19 permit the entry of heat into the roll so as to increase the rate of heating and reduce the time necessary to reheat the product for consumption.

The size of roll 18 is highly uniform since each roll begins with a noodle 12 of the same size and shape and the composition of meat and cheese mixture is carefully metered by dispensing device 14. It is assured therefore that the highly consistent product always conforms to the weight specification on the package and avoids the costly waste that is encountered when undersized portions must be discarded or when oversized portions are sold utilizing too much raw material. Of course, the appearance of the product is also much improved thus making the rolled lasagna more attractive to the consumer.

Many variations are possible to the present inventive process without departing from the spirit and the scope of the invention. For example, it is also contemplated that the rolled lasagna could be placed in a sealed plastic pouch within which it could be frozen, stored, marketed and reheated. In the prior art, this was not possible because the lasagna simply would not hold its shape well enough to be so packaged. Plastic pouches of this variety are well known to those skilled in the art. It is evident, however, that the consistent size and shape of the rolled lasagna of the present invention lends itself to being packaged in such a plastic pouch whereas the cut portions of the prior art layered substance would simply become mostly mush if packaged in such a manner.

I claim:

1. A process for preparing frozen lasagna comprising the steps of distributing a meat composition on one face of the lasagna noodles, rolling the noodles into a spiral roll with the meat covered surface facing inward and with plural openings passing through the roll at the center and out toward the edges, and then freezing the rolled noodle.

2. The process of claim 1 including the step of enclosing the rolled noodle in a plastic bag before the freezing step.

3. The process of claim 1 including the step of placing the rolled noodle in a tray prior to the freezing step.

4. The process of claim 1 wherein a liquid sauce is added before freezing.

References Cited

UNITED STATES PATENTS

| 2,768,086 | 10/1956 | Bliley | 99—85 |
| 2,214,917 | 9/1940 | Angell | 99—137 |
| D. 100,510 | 7/1936 | Tanzi | 1—14 |

FOREIGN PATENTS

| 377,766 | 8/1932 | Great Britain | 99—108 |

NORMAN YUDKOFF, Primary Examiner

H. H. BERNSTEIN, Assistant Examiner

U.S. Cl. X.R.

426—158, 513, 524